United States Patent
Chou (10) Patent No.: US 9,454,541 B2
(45) Date of Patent: Sep. 27, 2016

(54) SYSTEMS AND METHODS FOR STORING COMPRESSED DATA IN CLOUD STORAGE

(71) Applicant: Cyberlink Corp., Shindian, Taipei (TW)

(72) Inventor: Hung-Te Chou, Shindian (TW)

(73) Assignee: CYBERLINK CORP., Shindian, Taipei (TW)

( * ) Notice: Subject to any disclaimer, the term of this patent is extended or adjusted under 35 U.S.C. 154(b) by 131 days.

(21) Appl. No.: 14/339,917

(22) Filed: Jul. 24, 2014

(65) Prior Publication Data

US 2015/0089019 A1 Mar. 26, 2015

Related U.S. Application Data

(60) Provisional application No. 61/881,498, filed on Sep. 24, 2013.

(51) Int. Cl.
*G06F 15/16* (2006.01)
*G06F 17/30* (2006.01)
*H04L 29/08* (2006.01)

(52) U.S. Cl.
CPC ..... *G06F 17/30174* (2013.01); *H04L 67/1095* (2013.01); *H04L 67/1097* (2013.01)

(58) Field of Classification Search
CPC ........... H04L 67/1095; H04L 67/1097; G06F 17/30174
USPC ................. 709/201–203, 217–219, 246–247
See application file for complete search history.

(56) References Cited

U.S. PATENT DOCUMENTS

| | | | | |
|---|---|---|---|---|
| 8,639,781 B1 * | 1/2014 | Motes | ..................... | H04L 67/02 709/219 |
| 8,886,714 B2 * | 11/2014 | Brand | ..................... | H04L 67/10 709/203 |
| 2005/0235145 A1 * | 10/2005 | Slick | ................... | H04L 63/0428 713/165 |
| 2010/0198944 A1 * | 8/2010 | Ho | ........................ | H04L 12/189 709/217 |
| 2010/0257403 A1 | 10/2010 | Virk et al. | | |
| 2010/0274772 A1 * | 10/2010 | Samuels | ........... | G06F 17/30233 707/693 |
| 2013/0198321 A1 * | 8/2013 | Martin | .............. | G06F 17/30038 709/217 |
| 2014/0032710 A1 * | 1/2014 | Shin | .................... | H04L 67/1095 709/217 |
| 2014/0068018 A1 * | 3/2014 | Roh | .................... | H04L 67/1095 709/219 |
| 2014/0310746 A1 * | 10/2014 | Larsen | ................... | G06Q 10/10 725/37 |
| 2014/0379648 A1 * | 12/2014 | Chiu | ................. | G06F 17/30174 707/624 |
| 2015/0229713 A1 * | 8/2015 | Lu | ......................... | H04W 4/003 709/203 |
| 2016/0028811 A1 * | 1/2016 | Rashid | ................ | H04L 67/1095 715/738 |

FOREIGN PATENT DOCUMENTS

EP 2538330 A1 12/2012

* cited by examiner

*Primary Examiner* — Bharat N Barot
(74) *Attorney, Agent, or Firm* — McClure, Qualey & Rodack, LLP (57) ABSTRACT

In a cloud computing device for synchronizing digital content with a client device, a first hash value and a second hash value in a media file are received from the client device, the media file comprising a plurality group of pictures (GOP) blocks and searching for payloads and headers based on the first hash value and the second hash value. Based on the searching step, edited portions of the media file are identified. For each edited portion, payload data is requested from the client device based on the first hash value and header data based on the second hash value. The payload data and the header data received from the client device are then stored.

21 Claims, 8 Drawing Sheets

SYSTEMS AND METHODS FOR STORING COMPRESSED DATA IN CLOUD STORAGE

CROSS-REFERENCE TO RELATED APPLICATION

This application claims priority to, and the benefit of, U.S. Provisional patent application entitled, "Systems and Methods for Storing a Compressed Data Stream," having Ser. No. 61/881,498, filed on Sep. 24, 2013, which is incorporated by reference in its entirety.

TECHNICAL FIELD

The present disclosure generally relates to data storage and more particularly, to a system and method for storing compressed data in cloud storage.

BACKGROUND

Many users own multiple devices such as smartphones, tablets, and laptops that are capable of retrieving such digital content as music, movies, images, documents, and so on. As a result, users will many times upload their digital content to cloud storage device and synchronize with other devices for purposes of later accessing the content from different devices. However, large files can require a considerable amount of time to upload.

SUMMARY

Briefly described, one embodiment, among others, is a method implemented in a cloud computing device for synchronizing digital content with a client device. The method comprises receiving at least one of a first hash value and a second hash value in a media file from the client device, the media file comprising a plurality group of pictures (GOP) blocks and searching for payloads and headers based on the first hash value and the second hash value. Based on the searching step, edited portions of the media file are identified. For each edited portion, payload data is requested from the client device based on the first hash value and header data based on the second hash value. The method further comprises storing the payload data and the header data received from the client device.

Another embodiment is a method implemented in a cloud computing device for synchronizing digital content between the cloud computing device and a client device. The method comprises dividing a media file received from the cloud computing device into a plurality portions, each portion comprising at least one group of pictures (GOP) block and receiving hash values of header information and hash values of payloads of portions and determining whether at least one portion of the media file was updated in the cloud computing device. The method further comprises receiving and storing at least one of the header information and the payloads of determined edited portions and generating a second media file comprising at least one of unedited portions and the edited portions.

Another embodiment is a cloud-based storage system for synchronizing digital content with a client device. The system comprises at least one computing device including a processor, a cloud storage device, and an application executable in the at least one computing device. The application comprises a client interface configured to receive at least one of first hash value and second hash value in a media file from the client device, the media file comprising a plurality group of pictures (GOP) blocks. The application further comprises a content manager configured to search for payloads and headers based on the first hash value and the second hash value and based on the searching step, identify edited portions of the media file, the content manager being further configured to request from the client device, for each edited portion, payload data based on the first hash value and header data based on the second hash value, the content manager being further configured to store the payload data and the header data received from the client device.

Another embodiment is a non-transitory computer-readable medium embodying a program executable in a cloud computing device for synchronizing digital content with a client device. The program comprises code that receives at least one of first hash value and a second hash value in a media file from the client device, the media file comprising a plurality group of pictures (GOP) blocks and code that searches for payloads and headers based on the first hash value and the second hash value. The program further comprises code that identifies edited portions of the media file based on the search for payloads and headers and code that requests, from the client device, for each edited portion, payload data based on the first hash value and header data based on the second hash value. The program further comprises code that stores the payload data and the header data received from the client device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Systems and methods are disclosed for leveraging deduplication techniques to reduce the amount of data uploaded by a client device and the amount of data stored in the cloud, where only edited portions of a media file and system layer data are uploaded to the cloud. For various embodiments, the media file is broken down into elementary GOP (group of pictures) blocks prior to being updated in the cloud. With the deduplication techniques disclosed herein, modified GOP data and system layer data corresponding to unmodified GOP data are sent to the cloud storage server. In accordance with various embodiments, a client device calculates a first hash value of the at least one payload (C1 to Cn) portion of the GOP data in addition to a second hash value corresponding to the at least one header (H1 to Hn) for portions of a particular media file. Payloads C1 to Cn collectively have a corresponding hash value, and headers H1 to Hn collectively have a corresponding hash value.

The first hash value and the second hash value calculated for portions of the media file by the client device are then uploaded to the cloud storage server. The cloud storage server analyzes both hash values to identify edited portions, if any, and unedited portions of the media file. For some embodiments, the cloud storage server identifies edited and unedited portions of the media file by searching for the uploaded hash values. To identify which portions of the media file have been modified, the cloud storage server compares the uploaded first and second hash values with previously uploaded first and second hash values associated with the same portions of the media file.

The difference between the uploaded first hash value and the previously uploaded first hash value allows the cloud storage server to identify which payloads have been modified. Similarly, the difference between the uploaded second hash value and the previously uploaded second hash value allows the cloud storage server to identify which headers have been modified. Based on whether the cloud storage server finds the hash values in cloud storage, the cloud storage server sends a request to the client device to upload the identified edited portions for the cloud storage server to store.

When the cloud storage server receives the first and second hash values and performs a search, one of various scenarios will typically apply with regards to each portion. In a first scenario, the cloud storage server is able to find both the first and second hash values in cloud storage, which signifies that no portion of the media file have been edited or modified by the client device and that the cloud storage server is currently storing the most up-to-date copy of the media file. In a second scenario, the cloud storage server only finds the first hash value in cloud storage. This signifies that the header information of at least a portion of the media file has changed but that the payload data has not changed. The cloud storage server therefore sends a request to the client device to upload the modified header to the cloud storage server.

In a third scenario, the cloud storage server only finds the second hash value of the portion in cloud storage but not the first hash value of the portion. This signifies that the payloads of portion of the media file have been edited or modified but where the header information of the media file is unmodified. This scenario is less common as timing data contained in the header information typically changes when a media file is modified. The cloud storage server therefore sends a request to the client device to upload the modified payload to the cloud storage server.

In a fourth scenario, the cloud storage server is unable to find either the first or second hash values in cloud storage. This signifies that both the header information and the payloads of portions of the media file have been edited. The cloud storage server therefore sends a request to the client device to upload both the modified header information and the modified payloads. By requesting only modified data (e.g., modified payloads), the amount of data that is uploaded and the amount of data that is transmitted and stored by the cloud storage server is substantially reduced. Specifically, the systems disclosed analyze the syntax of the video data in determining what data to store.

Figure 5:
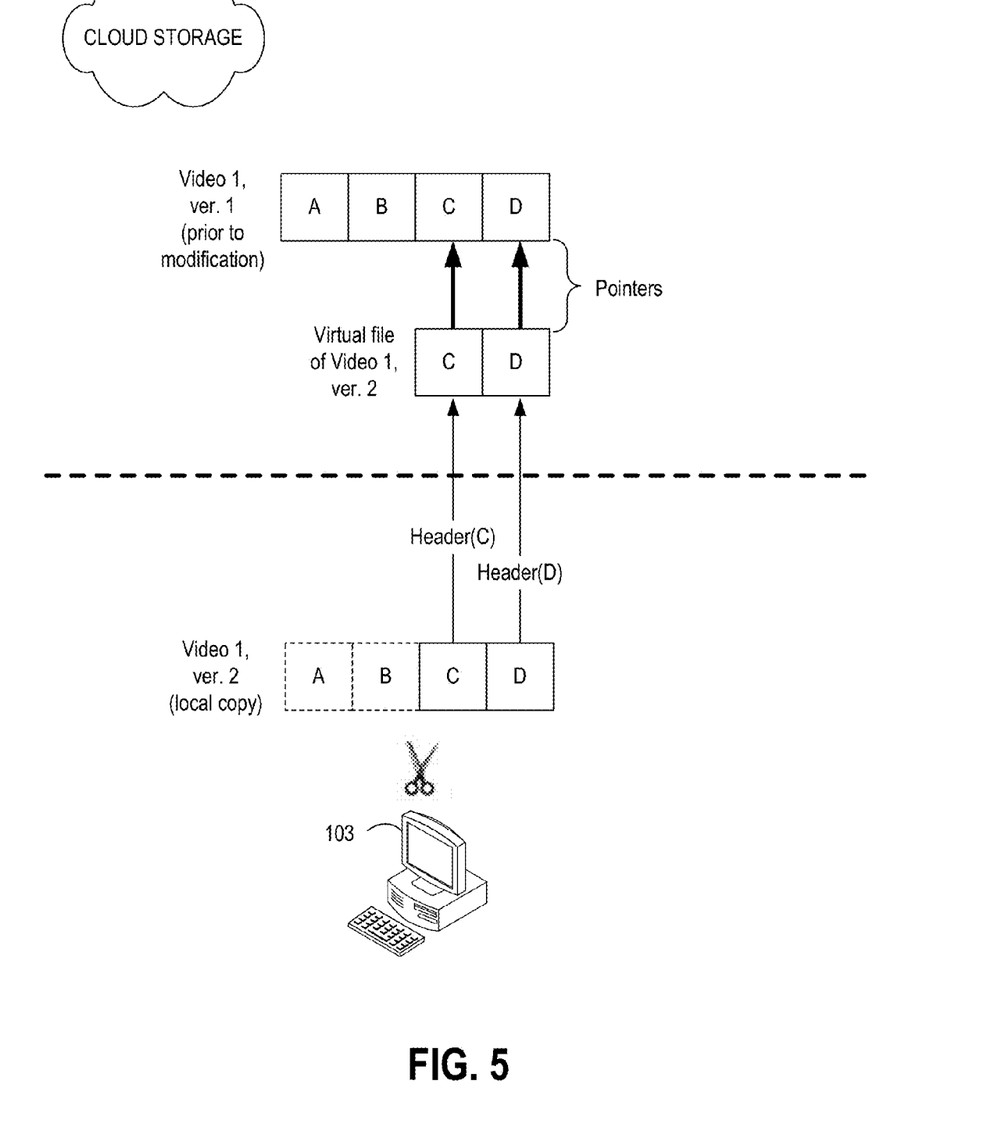
FIG. 5 provides an example of the synchronization process between a client device and the cloud computing device according to various embodiments of the present disclosure.

To further illustrate, reference is briefly made to FIG. 5, the payload for block C is unmodified. However, the header for block C is modified due to the removal of blocks A and B from the media file. In the example shown in FIG. 6, both the payload portion and the header information for block B is modified (resulting in modified block B2), whereas only the header information for blocks A, C, and D are modified due to the reordering of these blocks within the media file. Through the use of pointers, the cloud storage file system links the elementary GOP blocks with additional system layer data to generate a virtual media file. Furthermore, different virtual files may share the same elementary GOP blocks if they originate from the same source.

To further illustrate, consider a scenario where user A and user B both download a same media file. Suppose that user A edits the media file by deleting all advertisements within the media file. Suppose now that user A and user B transfer their respective versions of the media file to the cloud storage server. In accordance with the data deduplication techniques disclosed here, the cloud storage server identifies edited portions by searching for the first hash value and the second hash value for the two media files.

The cloud storage server generates a virtual file based on the difference of hash value and header information between the two medias. Significantly, the cloud device only needs to store one version of the media file (i.e., an unmodified version of the media file with all the advertisements and the headers of the unedited portions of the media file), thereby saving value storage space. When user A requests the media file from the cloud storage server, the cloud storage server constructs the version of the media file without advertisements, which user A downloads from the cloud storage server.

In accordance with some embodiments, a cloud-based environment is implemented for linking shared files and metadata with various devices, where the cloud-based environment comprises at least one client device and a cloud computing device. A description of a system for facilitating digital content synchronization between at least one client device and a cloud computing device is now described followed by a discussion of the operation of the components within the system.

Figure 1:
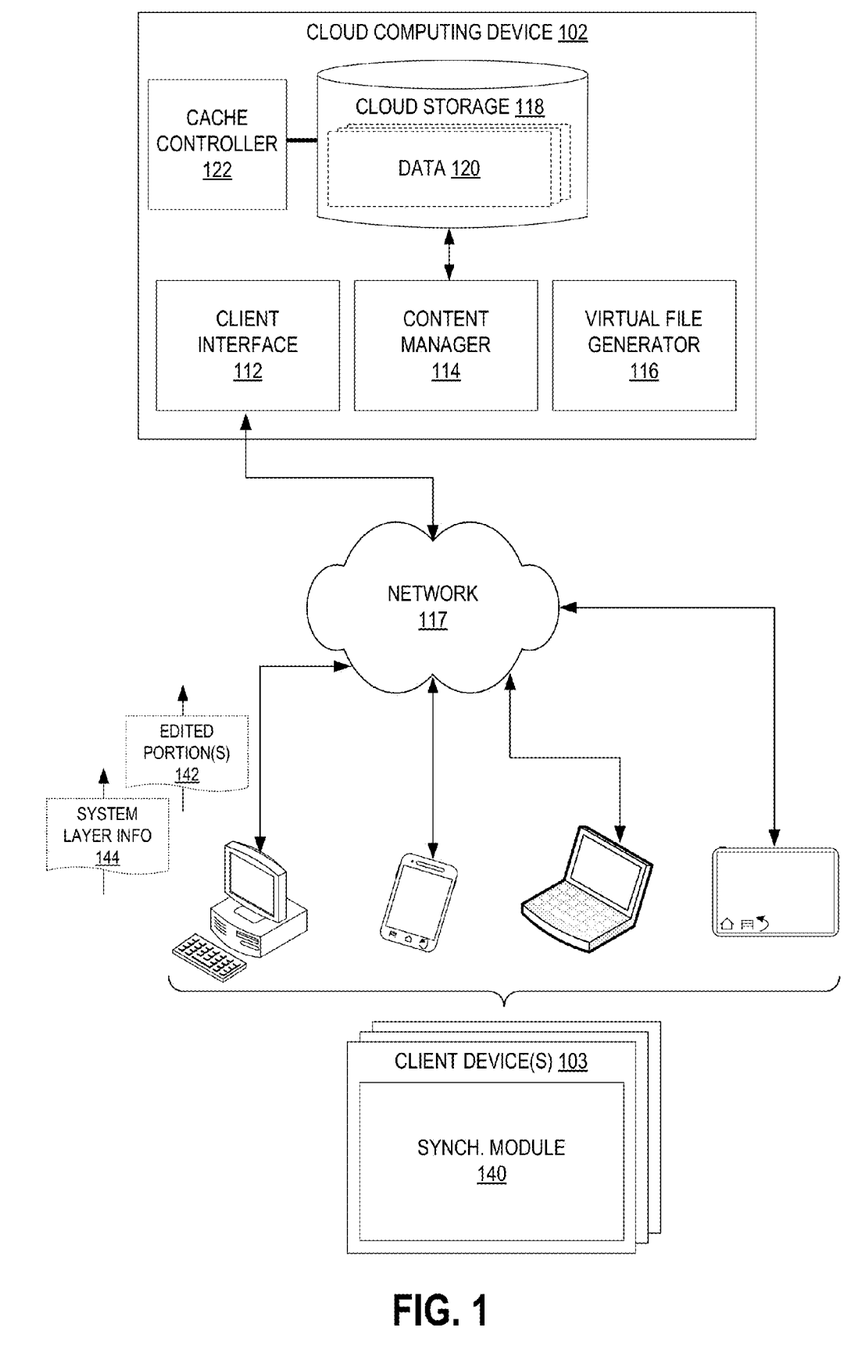
FIG. 1 is a block diagram of a networked environment in which embodiments for facilitating synchronization between at least one client device and a cloud computing device may be implemented in accordance with various embodiments of the present disclosure.

FIG. 1 is a block diagram of a networked environment in which embodiments of a cloud computing device 102 may be implemented. The cloud computing device 102 may be embodied, for example, as a server computer or any other system providing computing capability. Alternatively, the cloud computing device 102 may include a plurality of computing devices that are arranged, for example, in one or more server banks or computer banks or other arrangements. For example, a plurality of computing devices together may collectively comprise a cloud computing resource and/or any other distributed computing arrangement. Such computing devices may be located in a single installation or may be distributed among different geographical locations.

The components executed on the cloud computing device 102 may include, for example, a client interface 112, a content manager 114, and a virtual file generator 116. The client interface 112 is executed to receive hash values and edited portions of a media file from a client device 103, where the file has been edited by the client device 103. In accordance with some embodiments, each edited portion comprises a series of successive GOPs, where a GOP block referenced herein refers to a plurality of GOPs.

The content manager 114 is executed to determine if any portions of the media file have been modified by performing searches for receiving hash values (e.g., first and second hash values). Based on the determination of whether any portions of the media file have been edited, the content manager 114 notifies the client device 103 to transmit the edited portions of the media file for storage purposes, where the edited portions are received via the client interface 112. The content manager 114 is further configured to store, for each edited portion, the corresponding payloads of the GOPs in the edited portions, thereby saving valuable storage space.

The virtual file generator 116 is executed to generate a virtual file corresponding to the modified media file. For some embodiments, the virtual file comprises pointers, wherein the pointers indicate or point to which portion of memory/storage where the header information of the edited portions is stored or where both the stored the modified header information and the modified payloads of the edited portions are stored. The virtual file also includes pointers to the modified header information for the unedited portions, for example, block C and block D in FIG. 1. The cloud computing device 102 includes cloud storage 118 for storing data 120 comprising, for example, the header information, payload data, and so on. The cloud storage 118 may be representative of a plurality of storage devices as can be appreciated. The cloud storage 118 is coupled to a memory manager or cache controller 122.

The client device 103 is communicatively coupled to the cloud computing device 102 via a network 117, which may include, for example, the Internet, intranets, extranets, wide area networks (WANs), local area networks (LANs), wired networks, wireless networks, or other suitable networks, etc., or any combination of two or more such networks. The client device 103 may comprise a processor-based system such as a computer system, where the computer system may be embodied in the form of a desktop computer, a laptop computer, a smartphone, a tablet computing device, and so on.

The client device 103 is configured to execute various applications including a synchronization module 140, which may further include hash function generators configured to compute a first hash value for payloads in the media file and a second hash value corresponding to the header information for the media file.

The synchronization module 140 is further configured to synchronize files stored locally on the client device 103 with files stored by the cloud computing device 102. For some embodiments, the synchronization module 140 uploads the first and second hash values to the cloud computing device 102, which allows the cloud computing device 102 to identify the modified header information or modified payloads and unmodified header information or unmodified payloads of the media file based on whether the uploaded first and second values are found in cloud storage 118. The synchronization module 140 is further configured to upload edited portions 142 of the media file to the cloud computing device 102. The synchronization module 140 also retrieves system layer information 144 relating to both the edited portions 142 or the unedited portions of the media file and uploads the system layer information 144 to the cloud computing device 102.

As one of ordinary skill will appreciate, the multimedia content processed by the synchronization module 140 may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), MPEG-4 (MP4), Matroska (MKV), or any number of other digital formats.

Figure 2:
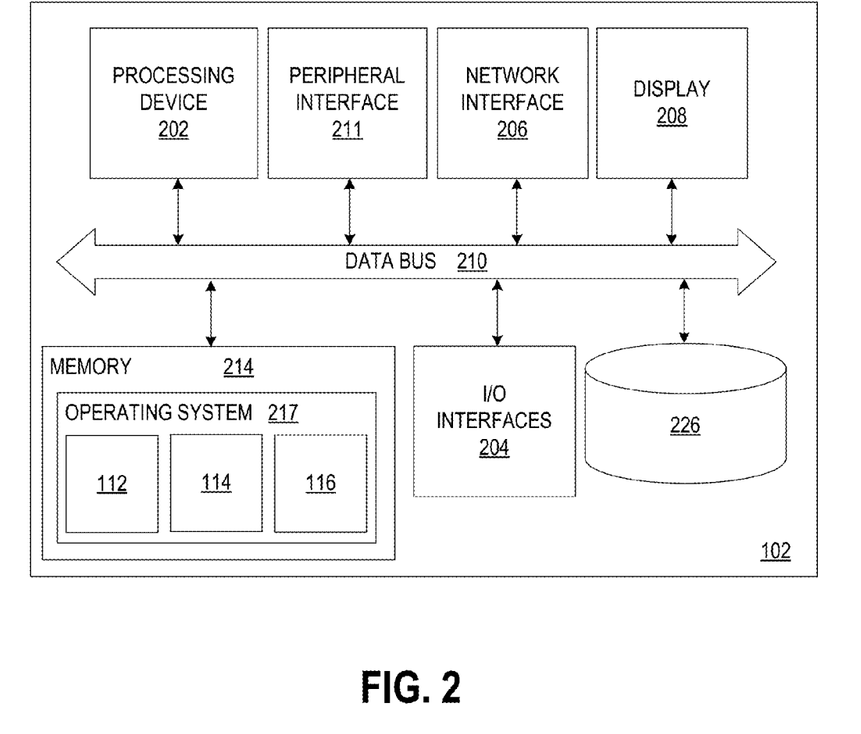
FIG. 2 is a detailed view of the cloud computing device of FIG. 1 in accordance with various embodiments of the present disclosure.

FIG. 2 is a schematic diagram of the cloud computing device 102 shown in FIG. 1. The cloud computing device 102 may be embodied in any one of a wide variety of computing devices, such as a dedicated server computer, multiprocessor computing device, and so forth. As shown in FIG. 2, the cloud computing device 102 comprises memory 214, a processing device 202, a number of input/output interfaces 204, a network interface 206, a display 208, a peripheral interface 211, and mass storage 226, wherein each of these devices are connected across a local data bus 210.

The processing device 202 may include any custom made or commercially available processor, a central processing unit (CPU) or an auxiliary processor among several processors associated with the cloud computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (client interface 112, content manager 114, virtual file generator 116) of the cloud computing device 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the cloud computing device 102 comprises a personal computer, these components may interface with one or more user input devices via the I/O interfaces 204, where the user input devices may comprise a keyboard or a mouse. The display 208 may comprise a computer monitor, a plasma screen for a PC, a liquid crystal display (LCD), a touchscreen display, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), hard disk drive, and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The cloud computing device 102 may communicate with one or more computing devices via the network interface 206 over the network 117 (FIG. 1). The cloud computing device 102 may further comprise mass storage 226.

Figure 3:
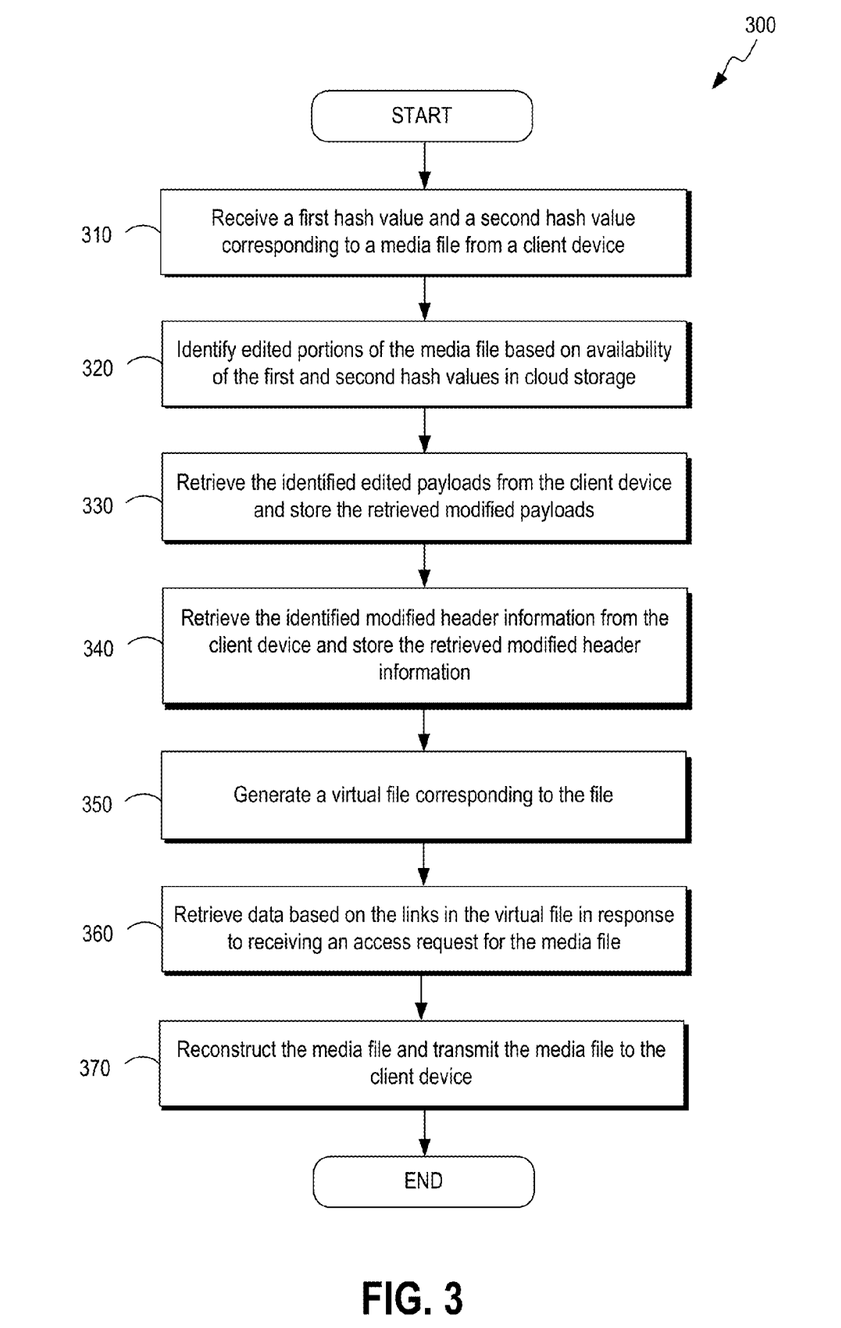
FIG. 3 is a top-level flowchart illustrating an example of functionality implemented as portions of the cloud computing device of FIG. 1 for facilitating synchronization and storage of digital content according to various embodiments of the present disclosure.

Reference is made to FIG. 3, which is a flowchart 300 in accordance with one embodiment for facilitating content distribution. It is understood that the flowchart 300 of FIG. 3 provides merely an example of the many different types of functional arrangements that may be employed to implement the operation of the various components of the cloud computing device 102 (FIG. 1). As an alternative, the flowchart of FIG. 3 may be viewed as depicting an example of steps of a method implemented in the cloud computing device 102 according to one or more embodiments.

Beginning with block 310, the cloud computing device 102 receives at least one of a first hash value and a second hash value corresponding to a media file from a client device 103 (FIG. 1), where the hash values are calculated by the client device 103. In block 320, the cloud computing device 102 identifies edited portions, if any, of the media file based on availability of the first and second hash values in cloud storage 118 (FIG. 1). In particular, the cloud computing device 102 performs a search of the first and second hash values received from the client device 103. For example, the cloud computing device 102 identifies modified header information and modified payloads by searching based on the first hash value and the second hash value.

In block 330, the cloud computing device 102 sends a request for the client device 103 to upload the identified edited payloads of the media file, which the cloud computing device 102 then stores in cloud storage 118. The edited portion comprises the modified header information, the modified payloads or both. For example, the cloud computing device 102 may send a request for the client device 103 to upload the identified modified payloads of the media file, which the cloud computing device 102 then stores in cloud storage 118. In block 340, the cloud computing device 102 retrieves and stores the modified header information of the edited portions of the media file. In block 350, the virtual file generator 116 generates a virtual file corresponding to the media file, where the virtual file comprises pointers to either the modified header information of the edited portion 142 or pointers to both the modified header information and the modified payloads of the edited portion 142. The virtual file also includes pointers to the header information and the payloads for the unedited portions.

In block 360, the cloud computing device 102 retrieves data based on the pointers in the virtual file in response to receiving an access request for the media file from a client device 103 (FIG. 1). The cloud computing device 102 reconstructs the media file based on the information in the virtual file, and in block 370, the cloud computing device 102 transmits the reconstructed media file to the client device 103.

Figure 4:
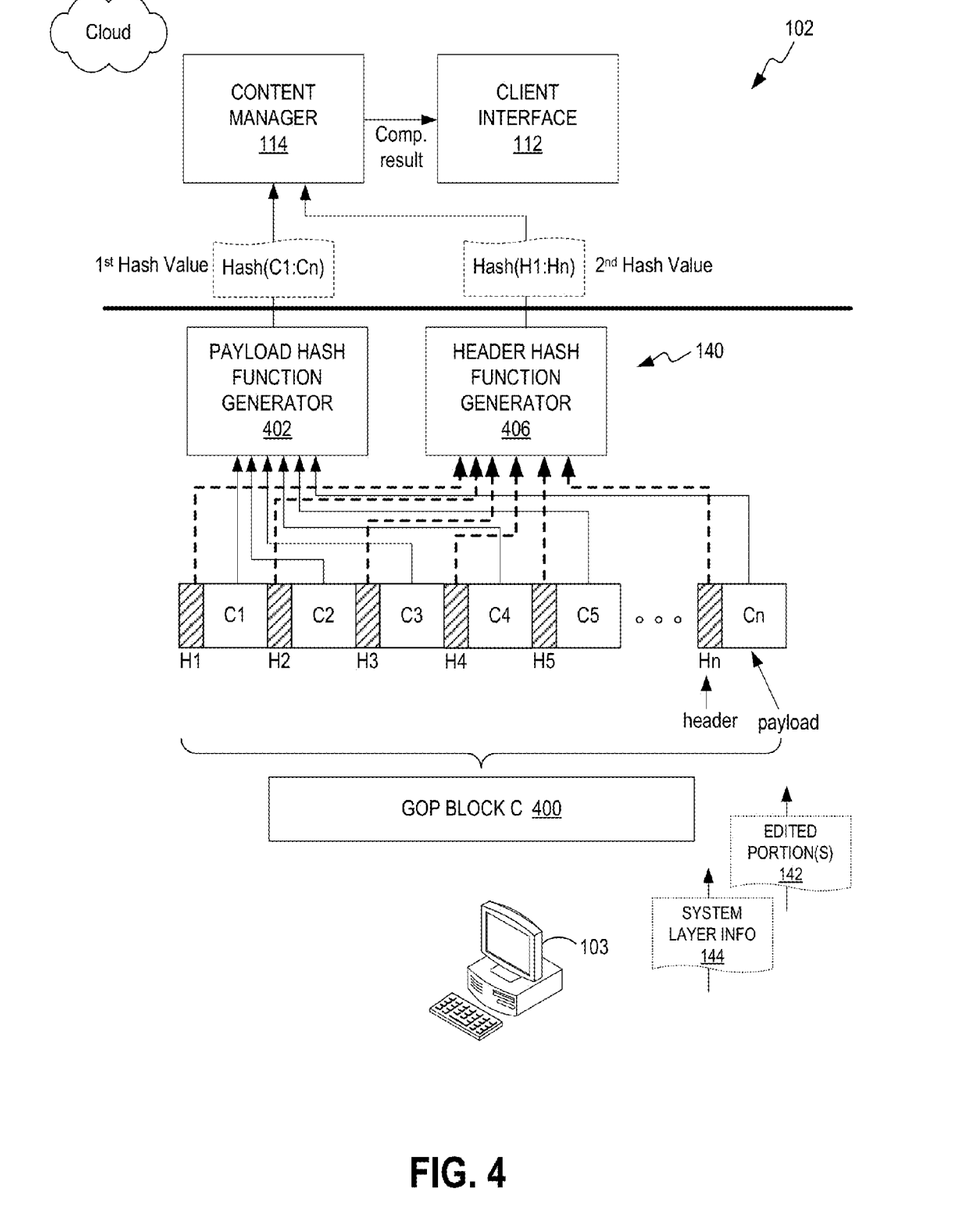
FIG. 4 illustrates the signal flow between various components of the content manager in FIG. 1 according to various embodiments of the present disclosure.

Reference is made to FIG. 4, which further illustrates various aspects of synchronizing digital content between a client device and a cloud computing device. Shown is an example of a media file that comprises one or more GOP blocks 400. Each GOP block 400 includes one or more GOPs. Each GOP includes I pictures (intra coded pictures), P pictures (predictive coded pictures), and B pictures (bi-predictive coded pictures) within the coded media file, where an I picture indicates the beginning of a GOP. A GOP header is usually stored before an I picture and includes such information as time code information, editing information, and so on.

Note that initially, the cloud computing device 102 does not have any media files and retrieves a first hash value and a second hash value from the client device 103 corresponding to an unmodified file. Thus, as the cloud computing device 102 does not initially have any media files, the cloud computing device 102 will not find any payload data and header data in the cloud computing device 102 based on the first hash value and the second hash value corresponding to the media file. The cloud computing device 102 therefore sends a request to have the client device 103 upload all payload data and all header data relating to the media file to the cloud computing device 102.

In this regard, the cloud computing device 102 will send a request to have the client device 103 upload modified payload data or modified header data of portions of the media file to the cloud computing device 102 if the cloud computing device 102 is unable to find the modified payload data or the modified header data in the cloud computing device 102 based on a search by the cloud computing device 102 using the first hash value and the second hash value sent by the client device 103. It should also be emphasized that when a client device 103 later requests access to a virtual file corresponding to a media file with both payloads and headers, the cloud computing device 102 retrieves the GOP data and system layer information from cloud storage 118 and reconstructs the media file and sends the reconstructed media file to the client device 103. The cloud computing device 102 retrieves payloads and headers according to a virtual file.

Figure 6:
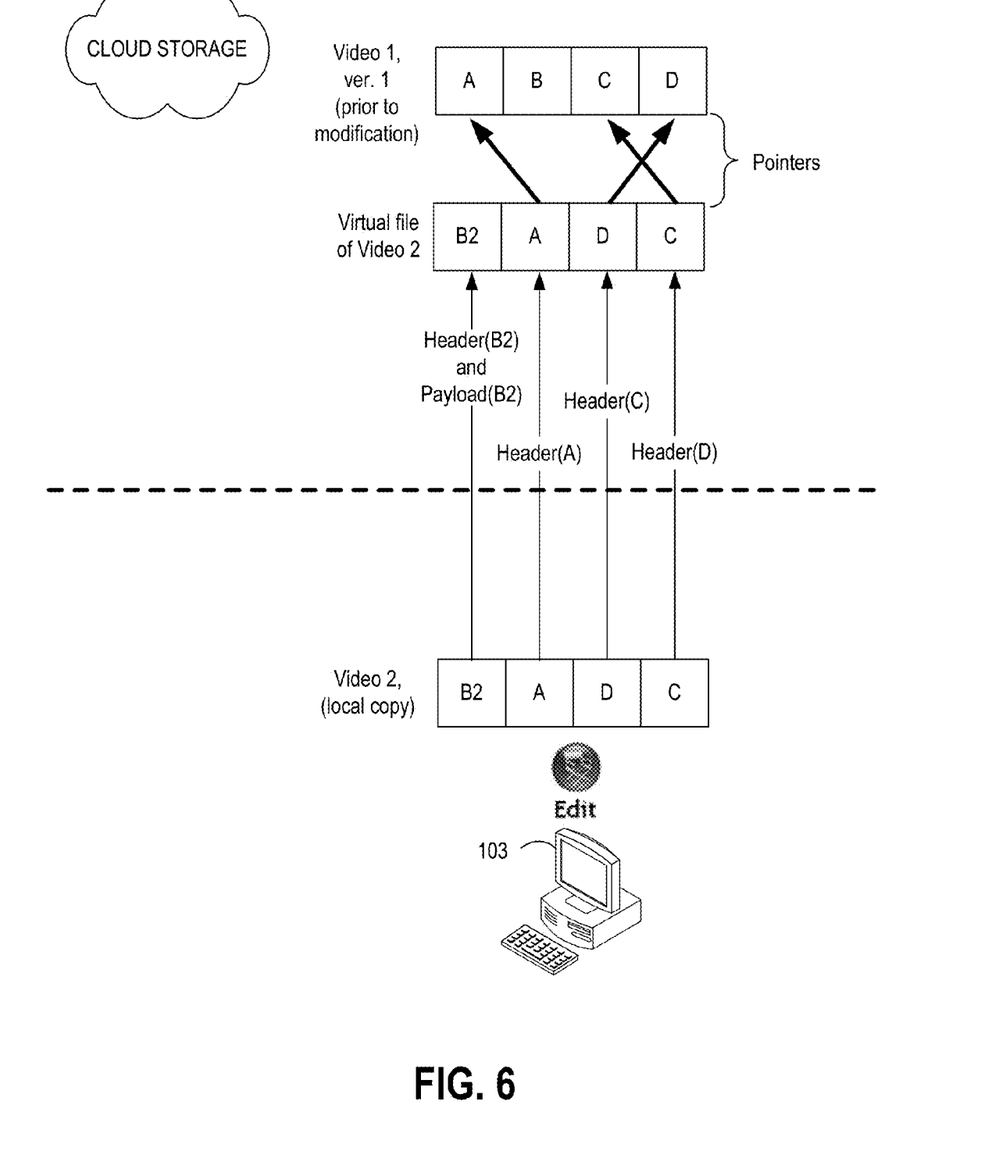
FIG. 6 provides another example of the synchronization process between a client device and the cloud computing device according to various embodiments of the present disclosure.

When the user edits a media file, the cloud computing device 102 determines which payload data or header data is not available in cloud storage 118 based on the cloud computing device 102 not being able to find a modified first hash value and a modified second value in the cloud computing device 102. Note that if the content of portions of the media file is unmodified, then the hash value remains unmodified. Referring, for example, to FIG. 6, when the user edits payload B to generate payload B2, payload B2 will have a different hash value than payload B. The hash value of the header typically changes when the media file is edited. The client device 103 may send the hash values all portions of the media to the cloud computing device 102 all at one time or one by one.

In accordance with some embodiments, the cloud computing device 102 sends all original hash values to the client device 103. Thus, the client device 103 is able to determine that at least one edited portion is not already stored in cloud storage 118 in the cloud computing device 102 based on the original hash value. As a result, the client device 103 uploads the edited portion to the cloud computing device 102. The client device 103 has a hash value different from the hash value at the cloud computing device 102. This serves as an indication that the client device 103 needs to upload the edited portion corresponding the hash value to the cloud computing device 102.

Note that either the cloud computing device 102 or the client device 103 may perform searches of payload data and header data based on the first hash value and the second hash value. Thus, depending on the particular implementation, either the cloud computing device 102 sends the hash values to the client device 103 or the client device 103 sends the hash values to the cloud computing device 102 for purposes of searching for the edited portion, which may comprise, for example, either the modified header information or the modified payloads. The client device 103 will send a complete media file (e.g., video 1, version 1) to the cloud computing device 102 when the cloud computing device 102 does not send a hash value to the client device 103.

In the example shown in FIG. 4, the GOP block 400 includes payloads C1 to Cn and headers H1 to Hn corresponding to (n) GOPs. In accordance with various embodiments, the synchronization module 140 comprises a payload hash function generator 402 that receives payloads C1 to Cn and applies a hash function to generate a hash value. The first hash value may be calculated, for example, using an MD5 hash generator, a secure hash algorithm (SHA), and other hash generator/algorithms.

The synchronization module 140 further comprises a header hash function generator 406 that receives each of the GOP headers in the GOP block 400 and calculates a second hash value. The second hash value may be calculated, for example, using an MD5 hash generator, a secure hash algorithm (SHA), and other hash generator/algorithms. The first hash value and the second hash value are then sent to the content manager 114 in the cloud computing device 102 (FIG. 1).

The content manager 114 searches for the first and second hash values to determine whether these particular hash values were previously stored in cloud storage 118 (FIG. 1). Based on the search results, the content manager 114 is able to determine the edited portions, if any, of the media file. Based on the search results generated by the content manager 114, the client interface 112 notifies the client device 103 to upload the identified edited portions 142 and system layer information 144. The content manager 114 stores the payloads of the GOP block 400 in cloud storage 118 (FIG. 1). For unedited portions of the media file, the content manager 14 stores header information of the unmodified GOP block. This data deduplication technique allows the memory manager 408 to reduce the amount of data stored in cloud storage 118.

The virtual file generator 116 (FIG. 1) then creates a virtual file associated with the media file, where the virtual file comprises either pointers to header information associated with the edited portions or pointers to both the header information and the corresponding payloads of the edited portions. The virtual file also includes pointers to the header information of the unedited portions. For some embodiments, a cache controller 122 (FIG. 1) may be implemented to cache data that is frequency accessed. Note that while the embodiment illustrated in FIG. 4 depicts the payload hash function generator 402 and the header hash function generator 406 being part of the content manager 114, these components may alternatively be implemented on the cloud computing device 102 (FIG. 1) side such that the first hash value and the second hash value described above is generated on the cloud computing device 102 side.

To further illustrate the synchronization process, reference is made to FIG. 5. Assume for the example shown that a copy of Video 1 comprising GOP blocks A, B, C, and D was previously uploaded prior to being edited and stored in cloud storage 118 (FIG. 1). That this, assume for purposes of illustration that version 1 of Video 1 was previously stored in the cloud. On the client device 103 side, the user edits Video 1 by trimming GOP blocks A and B while leaving GOP blocks C and D and version 2 of Video 1 is created.

The client device 103 calculates a first hash value (corresponding to the payload data) and a second hash value (corresponding to the header data) for version 2 of Video 1 (i.e., the edited version), where the first hash value corresponds to all the payloads in the video (C1:Cn) and the second hash value corresponds to all the headers in the video (H1:Hn), assuming there are a total of (n) GOPs as shown in FIG. 4. Header (C) represents a modified hash value corresponding to the header information.

The cloud computing device 102 receives the first hash value corresponding to the payload data and the second hash value corresponding to the header data from the client device 103. A search is performed by the cloud computing device 102 to determine if the payload data and the header data is stored in cloud storage 118 (FIG. 1), where the search is performed based on the first hash value and the second hash value. If the payload data is not found based on a search by the cloud computing device 102 utilizing the first hash value, then the cloud computing device 102 sends a request to have the client device upload the payload data. Similarly, if the header data is not found by the cloud computing device 102 based on the search utilizing the second hash value, then the cloud computing device 102 sends a request to have the header data upload the header data.

The client device 103 calculates a first hash value and a second hash value for version 1 of Video 1 currently stored in cloud storage, where version 1 corresponds to the version of Video prior to modification by the client device 103. The cloud computing device 102 then searches the locally-computed first hash value and the second hash value computed by the client device 103 to determine edited portions, where the search process is performed based on the first hash value and the second hash value.

Based on the search process, the cloud computing device 102 determines that Video 1 has been modified. However, as GOP blocks C and D have not been modified, the cloud computing device 102 does not request payloads associated with the edited portions from the client device 103 as GOP blocks C and D are already available in cloud storage. The cloud computing device 102 only requests the modified headers information. The content manager 114 (FIG. 4) only stores pointers to the header information corresponding to GOP blocks C and D, thereby reducing the amount of storage space used as additional copies of GOP blocks C and D are not saved.

The pointer/indexer is utilized by the cloud computing device 102 to reconstruct media files and indicates where to retrieve the header data and the payload data from cloud storage 118. As an example, suppose that the payload data is 95 bytes and that the header data is 5 bytes. The pointer/indexer indicates which folder the payload is stored in and which folder the header is stored in. Note that the payload data and the header data may be stored in a common folder or separate folders. The pointer/indexer may alternatively comprise a file name.

A virtual file containing pointers/indexers to GOP blocks C and D is generated and associated with the edited portions. When the client device 103 (FIG. 1) sends a request to the cloud computing device 102 to access version 2 of Video 1 (i.e., the modified version), the content manager 114 (FIG. 1) accesses the corresponding virtual file. Based on the pointers in the virtual file, the content manager 114 reconstructs the edited portions from cloud storage by retrieving data referenced by the pointers. The client interface 112 (FIG. 1) then sends the reconstructed edited portions to the client device 103 that originated the request.

FIG. 6 illustrates another example of synchronizing files between a client device 103 and the cloud computing device 102. In the example shown, a media file (i.e., Video 2) is edited, where GOP block B is modified to generate GOP block B2. Furthermore, GOP blocks A, C, and D are reordered. Assume for purposes of illustration that version 1 of Video 1 was previously stored in cloud storage 118 (FIG. 1), where version 1 of Video 1 comprises GOP blocks A, B, C, and D.

The cloud computing device 102 receives respective first hash values for payloads A, B, C, and D of video 1, version 1 from the client device 103. The cloud computing device 102 also receives respective second hash values corresponding to the headers for payloads A, B, C, and D of video 1, version 1 from the client device 103. The client device 103 calculates respective third hash values for payloads B2, A, D, and C as well as respective fourth hash values for the headers for Video 2. The cloud computing device 102 receives the third hash value (payloads) and the fourth hash value (headers) calculated by the client device 102 and performs a search.

Based on a search of the third hash value/fourth hash value, the cloud computing device 102 determines that B2 in the client device 103 has a different hash value upon searching the hash values. Specifically, by searching the third hash value/fourth hash value, the cloud computing device 102 determines that segment B2 has been modified by the client device 103 where an effect has been added to B2. That is, the third hash value is not found in cloud storage, where searching the third hash value indicates which block in a portion of the media file was modified.

The cloud computing device 102 then notifies the client device 103 to send the modified header for B2 and the payload of modified B2 and modified headers for A, D, C to the cloud computing device 102. The cloud computing device 102 notifies the client device 103 to send the modified headers because timing information for the headers of blocks A, D, and C have changed due to the reordering of these payloads in the video. Therefore, only header information comprising delta values for each of these blocks is stored in cloud storage 118. A virtual file is created for Video 2 that includes links to GOP blocks A, C, and D.

Figure 7:
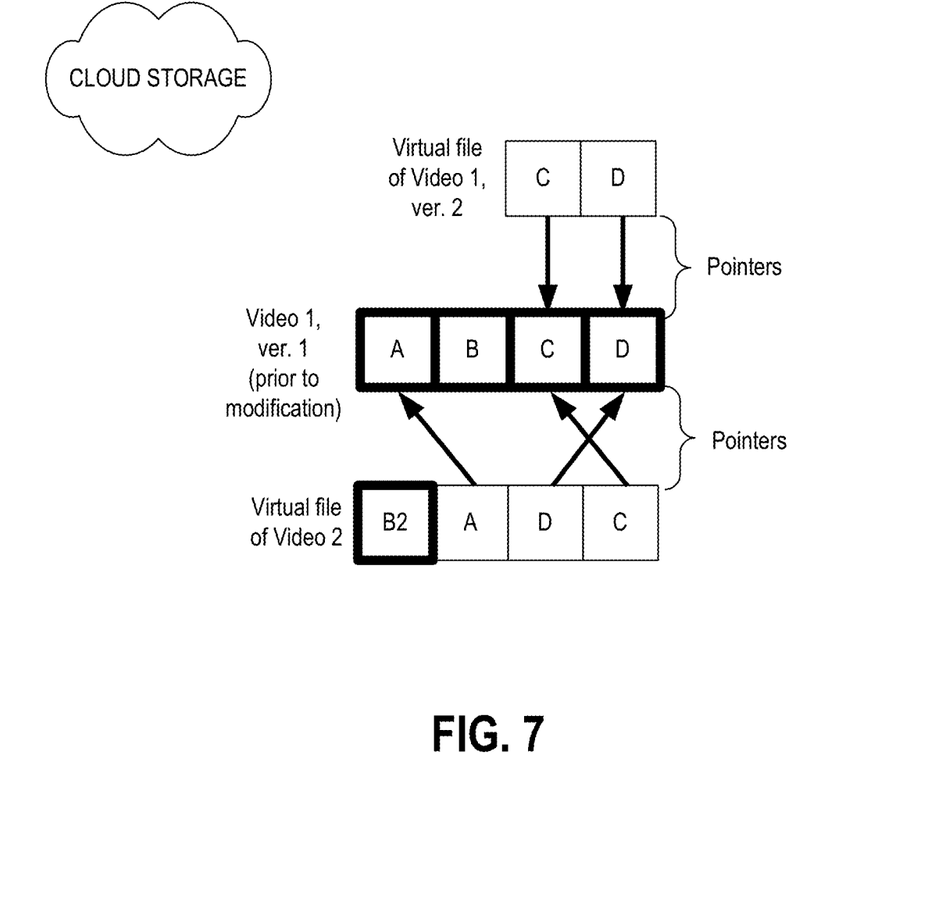
FIG. 7 illustrates data deduplication by the cloud computing device of FIG. 1 according to various embodiments of the present disclosure.

As illustrated in FIG. 7, virtual files of versions 1 and 2 of Video 1 and Video 2 are generated where only single copies of GOP blocks A, B, C, D, and B2 are stored for the three media files, thereby reducing storage space requirements. Furthermore, as GOP blocks A, C, and D are shared among the different media files, these GOP blocks do not need to be uploaded by the client device 103 (FIG. 1) to the cloud computing device 102 (FIG. 1), thereby reducing transmission time and bandwidth requirements between the client device 103 and the cloud computing device 102.

Figure 8:
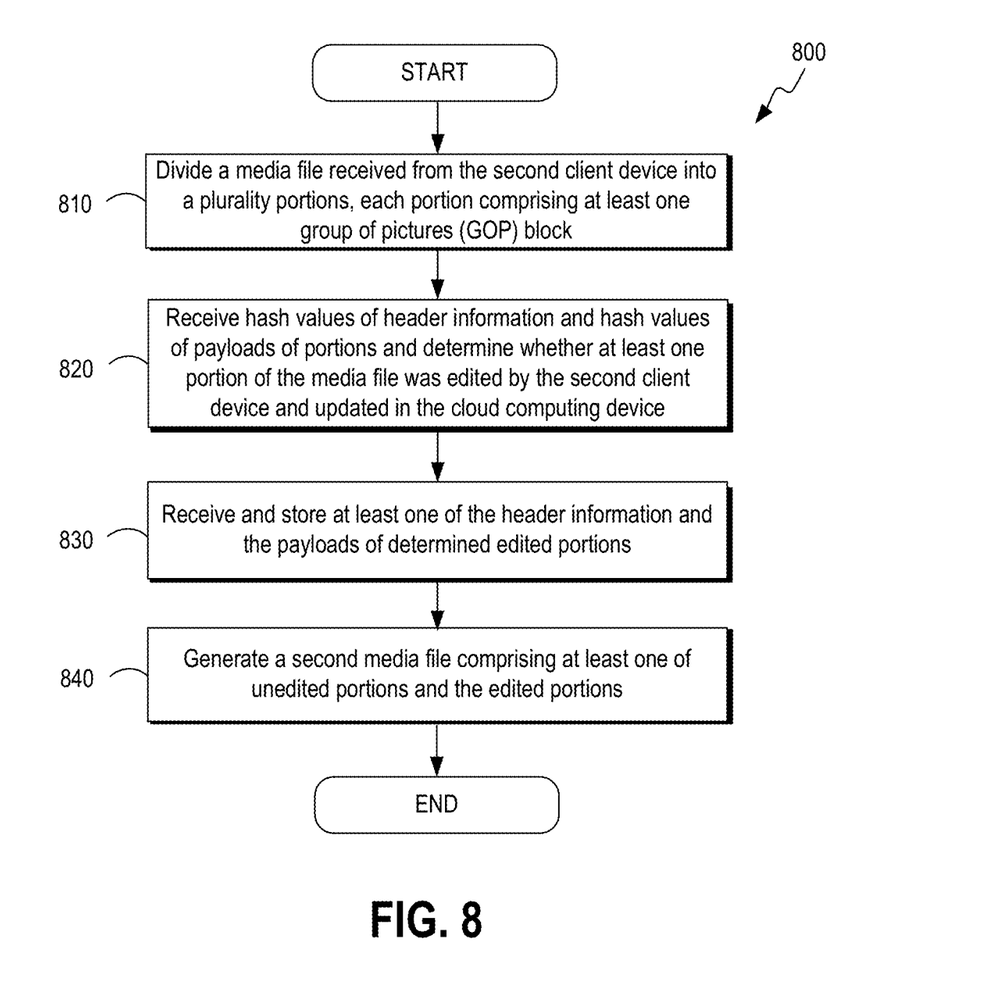
FIG. 8 is a top-level flowchart illustrating an example of functionality implemented as portions of the cloud computing device of FIG. 1 for facilitating synchronization and storage of digital content according to alternative embodiments of the present disclosure.

Reference is made to FIG. 8, which is a flowchart 800 in accordance with one embodiment for facilitating content distribution. It is understood that the flowchart 800 of FIG. 8 provides merely an example of the many different types of functional arrangements that may be employed to implement the operation of the various components of the cloud computing device 102 (FIG. 1). As an alternative, the flowchart of FIG. 8 may be viewed as depicting an example of steps of a method implemented in the cloud computing device 102 according to one or more embodiments.

For some embodiments, a first client device first synchronizes files with the cloud computing device 102. A second client device then later synchronizes with the cloud computing device. Specifically, beginning with block 810, the cloud computing device 102 divides a media file received from the second client device into a plurality portions, each portion comprising at least one group of pictures (GOP) block. In block 820, the cloud computing device 102 receives hash values of header information and hash values of payloads of portions and determining whether at least one portion of the media file was edited by a first client device and updated in the cloud computing device. In block 830, the cloud computing device 102 receives and stores at least one of the header information and the payloads of determined edited portions. In block 840, the second client device generates a second media file comprising at least one of unedited portions and the edited portions.

Note that for the alternative embodiment shown in FIG. 8, the cloud computing device does not receive and store at least one of the header information and the payloads of determined edited portions and generate a second media file comprising at least one of unedited portions in this embodiment, as discussed above in connection with other embodiments.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a cloud computing device for synchronizing digital content with a client device, comprising:
   receiving at least one of a first hash value and a second hash value in a media file from the client device, the media file comprising a plurality group of pictures (GOP) blocks;
   searching for payloads and headers based on the first hash value and the second hash value;
   based on the searching step, identifying edited portions of the media file;
   for each edited portion, requesting, from the client device, payload data based on the first hash value and header data based on the second hash value; and
   storing the payload data and the header data received from the client device.

2. The method of claim 1, further comprising generating a virtual file corresponding to the media file, the virtual file comprising pointers to the stored payload and pointers to the header information.

3. The method of claim 2, further comprising:
in response to receiving an access request from the client device for the media file, retrieving data based on the pointers in the virtual file; and
transmitting the retrieved data to the client device.

4. The method of claim 1, wherein requesting the payload data from the client device for each edited portion is performed in response to not finding the first hash value in the cloud computing device.

5. The method of claim 1, wherein requesting header data for each edited portion is performed in response to not finding the first hash value in the cloud computing device.

6. The method of claim 1, wherein the edited portions of the file are generated by the client device.

7. The method of claim 1, wherein the edited portion comprises at least one of the modified header information and the modified payload.

8. The method of claim 6, wherein the edited portions are generated by the client device by performing at least one of:
edited content in at least one GOP block; and
reordering GOP blocks.

9. A cloud-based storage system for synchronizing digital content with a client device, comprising:
at least one computing device including a processor;
a cloud storage device; and
an application executable in the at least one computing device, the application comprising:
a client interface configured to receive a first hash value and a second hash value in a media file from the client device, the media file comprising a plurality group of pictures (GOP) blocks; and
a content manager configured to search for payloads and headers based on the first hash value and the second hash value and based on the searching step, identify edited portions of the media file, the content manager being further configured to request from the client device, for each edited portion, payload data based on the first hash value and header data based on the second hash value, the content manager being further configured to store the payload data and the header data received from the client device.

10. The system of claim 9, further comprising a virtual file generator configured to generate a virtual file corresponding to the media file, the virtual file comprising pointers to the stored payload and pointers to the header information.

11. The system of claim 10, wherein in response to the client interface receiving an access request from the client device for the media file, the content manager retrieves data based on the pointers in the virtual file and the client interface transmits the retrieved data to the client device.

12. The system of claim 9, wherein the cloud storage device is implemented as a cache memory configuration.

13. The system of claim 9, wherein the content manager requests the payload data from the client device for each edited portion in response to not finding the first hash value in the cloud computing device.

14. The system of claim 9, wherein the content manager requests header data for each edited portion in response to not finding the first hash value in the cloud computing device.

15. The system of claim 9, wherein the edited portions of the file are generated by the client device.

16. The system of claim 9, wherein the edited portion comprises at least one of the modified header information and the modified payload.

17. A non-transitory computer-readable medium embodying a program executable in a cloud computing device for synchronizing digital content with a client device, comprising:
code that receives a first hash value and a second hash value in a media file from the client device, the media file comprising a plurality group of pictures (GOP) blocks;
code that searches for payloads and headers based on the first hash value and the second hash value;
code that identifies edited portions of the media file based on the search for payloads and headers;
code that requests, from the client device, for each edited portion, payload data based on the first hash value and header data based on the second hash value; and
code that stores the payload data and the header data received from the client device.

18. The computer-readable medium of claim 17, further comprising code that generates a virtual file corresponding to the media file, the virtual file comprising pointers to the stored payload and pointers to the header information.

19. The computer-readable medium of claim 18, further comprising code that retrieves data based on the pointers in the virtual file and transmits the retrieved data to the client device in response to receiving an access request from the client device for the media file.

20. The computer-readable medium of claim 17, wherein the payload data is requested from the client device for each edited portion in response to not finding the first hash value in the cloud computing device.

21. The computer-readable medium of claim 17, the header data is requested for each edited portion in response to not finding the first hash value in the cloud computing device.

* * * * *